(12) United States Patent
Hambrecht

(10) Patent No.: US 12,523,570 B2
(45) Date of Patent: Jan. 13, 2026

(54) OVERLOAD PROTECTION FOR DRIVE TEST STANDS

(71) Applicant: FLENDER GMBH, Bocholt (DE)

(72) Inventor: Ralf Hambrecht, Bocholt (DE)

(73) Assignee: FLENDER GMBH, Bocholt (DE)

( * ) Notice: Subject to any disclaimer, the term of this patent is extended or adjusted under 35 U.S.C. 154(b) by 208 days.

(21) Appl. No.: 18/278,929

(22) PCT Filed: Feb. 21, 2022

(86) PCT No.: PCT/EP2022/054174
§ 371 (c)(1),
(2) Date: Aug. 25, 2023

(87) PCT Pub. No.: WO2022/179959
PCT Pub. Date: Sep. 1, 2022

(65) Prior Publication Data
US 2024/0142341 A1 May 2, 2024

(30) Foreign Application Priority Data
Feb. 26, 2021 (EP) .................................... 21159586

(51) Int. Cl.
*G01M 13/021* (2019.01)
*G01M 13/025* (2019.01)

(52) U.S. Cl.
CPC ........ *G01M 13/021* (2013.01); *G01M 13/025* (2013.01)

(58) Field of Classification Search
CPC ........................... G01M 13/021; G01M 13/025
See application file for complete search history.

(56) References Cited

U.S. PATENT DOCUMENTS

| | | | |
|---|---|---|---|
| 2002/0189320 A1 | 12/2002 | Otaki et al. | |
| 2013/0283899 A1* | 10/2013 | Plowman | G01M 13/021 73/115.02 |
| 2024/0125672 A1* | 4/2024 | Hambrecht | G01M 13/022 |

FOREIGN PATENT DOCUMENTS

| | | | | |
|---|---|---|---|---|
| CN | 102213643 A | * | 10/2011 | G01M 15/02 |
| CN | 203230824 U | * | 10/2013 | F16H 57/00 |
| CN | 105372069 A | * | 3/2016 | G01M 13/04 |

(Continued)

OTHER PUBLICATIONS

International Search Report for International Application No. PCT/EP2022/054174 dated Jun. 8, 2022 (3 pages).

(Continued)

*Primary Examiner* — Tisha D Lewis
(74) *Attorney, Agent, or Firm* — REISING ETHINGTON, P.C.

(57) ABSTRACT

A rotor bearing unit for testing a drive component is described. The rotor bearing unit has a shaft part, a guide box, and a housing part. The shaft part is rotatably arranged relative to the housing part, the housing part is frictionally connected to the guide box, the housing part of the rotor bearing unit is designed to connect to a housing of the drive component to be tested in a force-fitting and/or form-fitting manner, and the shaft part of the rotor bearing unit is designed to connect to a shaft of the drive component to be tested in a force-fitting and/or form-fitting manner. Additionally, a test structure including such a rotor bearing unit is described.

19 Claims, 2 Drawing Sheets

(56) References Cited

FOREIGN PATENT DOCUMENTS

| CN | 110823566 A | 2/2020 |
|---|---|---|
| DE | 102007032412 A1 | 1/2009 |

OTHER PUBLICATIONS

English Translation of International Search Report for International Application No. PCT/EP2022/054174 dated Jun. 8, 2022 (2 pages).
Written Opinion for International Application No. PCT/EP2022/054174 dated Jun. 8, 2022 (7 pages).

* cited by examiner

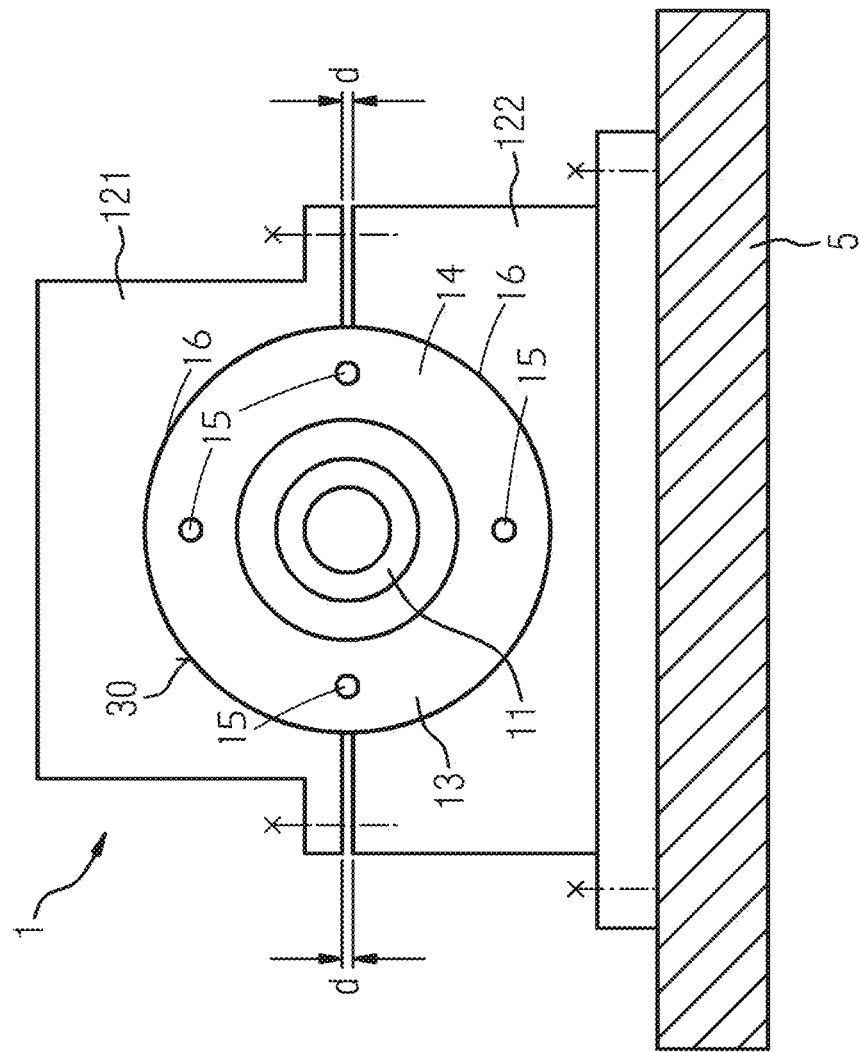
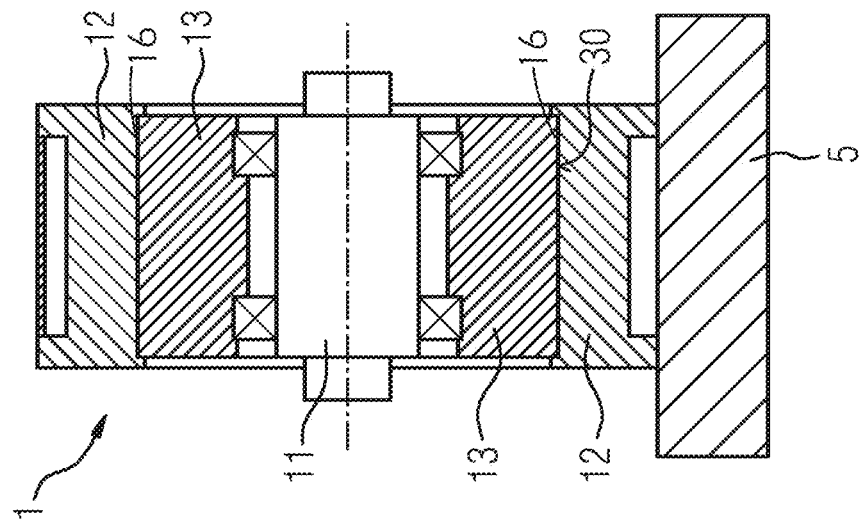

OVERLOAD PROTECTION FOR DRIVE TEST STANDS

CROSS REFERENCE TO RELATED APPLICATIONS

The present application is a US national phase of PCT application no. PCT/EP2022/054174, which was filed on Feb. 21, 2022 and titled "Overload protection for drive test stands", which claims priority from European patent application no. EP 21159586.3, which was filed on Feb. 26, 2021 and titled "Overload Protection for Drive Test Benches".

INTRODUCTION

The disclosure relates to a rotor bearing unit for testing a drive component. The disclosure further relates to a test setup having a rotor bearing unit of this type, wherein the test setup furthermore has the drive component to be tested. In addition, the disclosure relates to the use of a rotor bearing unit of this type and/or of a test setup of this type.

Nowadays, drive components, such as, for example, a transmission, a transmission/generator combination, or else a generator, are tested as a module or modules in integrated systems. This is true in particular of drive components of wind turbines, the performance and construction of which are tested in modules. In systems of this type, the transmission is frequently arranged between a generator and a rotor bearing of the drive train. The drive components are connected here in a force-fitting and/or form-fitting manner to the adjacent shafts. The transmission is frequently designed here as a planetary transmission. Within the scope of development tests or series acceptance tests, the system is tested under rotational speed and frequently also under torque in a torque circuit.

If a malfunction occurs, an abrupt deceleration of the shaft may be required. The forces necessary for this purpose are absorbed by the rotor bearing unit and introduced into the foundation of the rotor bearing unit or of the test setup. The forces and moments occurring in the process have to be able to be withstood by the carrying structure in the intersection with the foundation and have to be able to also be absorbed by the foundation without damage. The corresponding components therefore have to be configured for said mechanical loading; otherwise, components may break because of the loading and the stored kinetic energy of the system could become erratically free, for example by fragments flying around under certain circumstances. From safety aspects, this state may be alarming.

To manage the risk, use is made nowadays of safety clutches or slipping clutches in order, for example, to protect the modules of transmission and generator from one another and to separate them from one another in the event of a malfunction. It is known from DE 10 2007 032 412 A1, in the case of a wind turbine of this type, to indicate the extent of slipping of the slipping clutch using an axially displaceable measurement body of a measurement device in order to be able to identify the need for maintenance.

It is known from CN 110 823 566 A to subject a friction clutch for a motor vehicle to a fatigue test by the friction clutch, which is enclosed in a fixed housing, being driven by a drive at a high rotational speed via a step-up transmission, the step-up transmission acting on an axial side of the friction clutch and a concomitantly rotating shaft being axially pressed onto the other axial side of the friction clutch.

In the following it will not be differentiated between testing and checking of components.

SUMMARY

At least one embodiment of the disclosure is based on the object of improving the arrangement for testing a drive component.

The object is achieved, per at least one embodiment, by a rotor bearing unit having the features of claim 1, a test setup having the features of claim 8, and the use having the features of claim 14. Preferred configurations, per at least one embodiment, are indicated in the dependent claims and in the description below, said configurations in each case individually or in combination being able to present an aspect of the disclosure. If one feature is illustrated in combination with another feature, this serves only for the simplified illustration of the disclosure and should not in any way mean that this feature cannot also be a development of the disclosure without the other feature.

The rotor bearing unit for testing a drive component has a shaft part, a guide box, and a housing part, wherein the shaft part is arranged rotatably in relation to the housing part, wherein the housing part is connected in a frictionally locking manner to the guide box, wherein the housing part of the rotor bearing unit is designed for force-fitting and/or form-fitting connection to a housing of the drive component to be tested, wherein the shaft part of the rotor bearing unit is designed for force-fitting and/or form-fitting connection to a shaft of the drive component to be tested. The test setup has a rotor bearing unit of this type, wherein the test setup furthermore has the drive component to be tested, in particular the transmission or the planetary transmission, wherein the housing part of the rotor bearing unit is connected in a force-fitting and/or form-fitting manner to the housing of the drive component to be tested, wherein the shaft part of the rotor bearing unit is connected in a force-fitting and/or form-fitting manner to the shaft of the drive component to be tested.

The disclosure is based, inter alia, per at least one embodiment, on the finding that it is possible with the proposed arrangement to reduce the mechanical loading of the drive components and of the foundation. The disclosure, per at least one embodiment, makes it possible to protect test setups of systems in the event of a malfunction, even when the components, for example the foundation, have a low load-bearing capacity, without the carrying structures being subjected to excessive loads and being able to cause uncontrolled movements or destruction.

For this purpose, the rotor bearing unit has the shaft part, the guide box, and the housing part. The shaft part is connected to the shaft of the drive component to be tested and can support the latter. An example here is the input shaft of a transmission, in particular of a planetary transmission. The input shaft can be, for example, the planet carrier of a planetary transmission. In the case of the planetary transmission as the drive component, furthermore the shaft can also be centered by the rotor bearing unit. The shaft part is rotatably connected to the housing part via bearings, for example. The shaft part can therefore rotate during the tests. The housing part and the guide box are connected to one another in a frictionally locking manner. These components are fixed horizontally and vertically in relation to one another here. If a torque now acts between housing part and guide box, a force acts at the boundary between housing part and guide box. If said force exceeds the force which arises by means of the frictional locking, the housing can under-take a rotational movement about its own axis in relation to the guide box. This is used for the error situation if, for example, blocking of the transmission or of the bearing of the rotor in the generator occurs. By means of this blockage in the drive component, for example in the toothing of the transmission or the rotor bearing of the rotor/generator, a kinetic energy of the rotating centrifugal masses acts as a shock pulse on the carrying structure in the connection with the foundation.

It has been recognized that the drive component, in particular a planetary transmission, is distinguished by components which are rotatable relative to one another. The drive component to be tested namely has a shaft which is rotatable relative to a fixed housing. To check or test the drive component, the shaft of the drive component to be tested therefore has to be coupled to the shaft part of the rotor bearing unit for conjoint rotation while the housing should actually be secured immovably, for example by immovably fixing it to a fixed component of the test stand and/or to a foundation. Since, however, the drive component to be tested is consciously intended to be exposed to extreme operating situations, it is not improbable that a component failure in the drive component to be tested may occur, wherein said component failure may lead to nonrotatable blocking of the shaft of the drive component by the housing of the drive component. Owing to the fact that the housing, which is actually fixed in a stationary manner, is not fixed to a rigid, stationary body, but rather is connected to the housing part of the rotor bearing unit, when the shaft of the drive component is blocked by the housing of the drive component in the event of a component failure, the housing part of the rotor bearing unit, which housing part is connected to the housing, can slip through at the guide box. This slip-type operation prevents hard striking and can significantly reduce the maximally occurring torque which is to be suddenly supported, and therefore, in the event of a malfunction, the carrying structures are subjected to lower loads and uncontrolled movements or destruction can be avoided.

A torque limiter can be formed between the housing part of the rotor bearing unit and the guide box of the rotor bearing unit, said torque limiter being able to slip through above a defined limit torque and cause frictionally locking braking. The torque limiter which is formed is here part of the rotor bearing unit for the test setup and not part of the drive component to be tested, and therefore a torque limit does not have to be maintained for test purposes in the module to be tested and the production costs are kept low. The frictional locking between the housing part and the guide box can form a low-pass filter which limits the maximum torque to be supported to the limit torque set. The limit torque depends on frictional properties, in particular coefficient of friction and contact pressure force, between the housing part and the guide box, which frictional properties are suitably selected to set the desired maximum torque. The housing part and the guide box preferably, per at least one embodiment, lie directly in contact with each other. For example, a press fit is provided between the housing part and the guide box. The housing part and the guide box are in particular free from frictional linings, that is to say are coupled in a frictionally locking manner to each other without friction linings being provided between the housing part and the guide box. This ensures that, if the housing part slips through at the guide box, in particular because of steel/steel contact, a clearly audible noise occurs without additional aids, the noise directly intuitively and cost-effectively signaling that there is a malfunction.

By means of the connection of the housing part to the housing of the drive component to be tested, for example by means of a flange, a corresponding torque arises between the housing part and the guide box, the torque having the effect that the housing part rotates in relation to the guide box. It is therefore possible to avoid the enormous dynamic forces for the abrupt deceleration of the rotating centrifugal masses in the drive train of the test setup, which forces would have to be able to be withstood by the support structure in conjunction with the foundation and the foundation itself and can lead there to damage in the event of overloading.

With increasing size, performance and mass of the components used in the test setup, the rotational energies in the system become so high that, in conjunction with a malfunction, an abrupt deceleration by the surrounding structures cannot be ensured in terms of strength for every level of the mass, in particular for the rotating mass. The components which would be excessively loaded by a malfunction of this type are subject to the risk of breaking, and the stored kinetic energy of the system would result in an uncontrolled movement of large masses. Tests of this type take place in production and assembly halls. This would both constitute a safety risk for the people working in the surroundings and would also be able to cause high material damage in the event of a malfunction. The proposed setup makes it possible to provide security against breakage and to reliably avoid uncontrolled movements of fragments. As a result, test setups of this type can also be erected in production and assembly halls without further strength-increasing measures and associated overdimensioning in order to eliminate or reduce the previously described risk potential.

If, for example, a vehemence test of the generator in the system at a nominal rotational speed is involved, a malfunction in the transmission, for example due to fragments wedging in the toothings, could lead to a sudden occurrence of high loads which are necessary to keep the system in its position.

By means of the rotor bearing unit which is proposed, the kinetic energy stored in the systems is converted in the event of a malfunction, such as, for example, internal blocking in the transmission, into heat and rotational energy of an expanded system about a defined axis.

In this case, the drive system to be tested and consisting of a planetary transmission with a generator optionally coupled thereto can be subjected to a final load and rotational speed test to test the function and load. The same can also be carried out for a transmission, a transmission/generator combination, or else just a generator.

With the proposed arrangement, per at least one embodiment, a closed torsion torque circuit is produced, in which the housing part is configured in such a manner that, although it is fixed in its horizontal and vertical position in a guide box, it permits a rotational movement of the expanded system in the event of a malfunction. In the normal undisturbed test or check run, only the shaft part rotates, and the housing part is at a standstill. If, for example in the transmission, a rolling malfunction or a functional blocking occurs, the housing part would act as an instantaneous center of rotation and would attempt to introduce forces from the stored kinetic energy into the foundation via the support structure. This and an associated possible overloading of the support structure is prevented by the proposed arrangement, per at least one embodiment, in that the housing part is connected in a frictionally locking manner to the guide box such that free rotation in the event of an overload is permitted. In particular, per at least one embodiment, a pure frictionally locking connection between the housing part and the guide box is advantageous because the free rotation in the event of an overload can therefore be made possible under all operating conditions.

The previous carrying structures are designed and dimensioned in such a manner that forces and moments resulting from possible malfunctions, e.g. blocking in the transmission or in the generator rotor, can be absorbed and transmitted into the foundation. With the proposed test setup, per at least one embodiment, larger systems in terms of nominal power, with correspondingly larger moments of inertia and/or rotational energies, can also be tested on the test stand with the proposed rotor bearing unit. In other words, the performance of the test stand can be significantly increased using the proposed arrangement.

The adjustable distance and the suitable selection of the contacting materials between guide box and housing part make it possible to set the loads which occur in such a manner that the components which are in force-fitting connection are not overloaded. These components include in particular screw connections of the feet to the foundations that would be put at risk by overloading.

In comparison to a slipping clutch as an overload clutch, as is used, for example, in the case of detached high-speed drive trains, the setup of the test stand with the proposed rotor bearing unit or the test setup, in particular for integrated hybrid systems consisting of a transmission/generator system, is significantly more cost-effective taking into consideration the discussed safety aspects.

To obtain a CE marking of test setups, malfunctions have to be reliably absorbed. For this purpose, a risk/hazard assessment describes how this protection against a malfunction is realized. Since the hazard potential due to breakage and parts flying around is reliably avoided by the design of the rotor bearing unit or the test setup solely from physical aspects, evidence in this regard is correspondingly easy to provide.

For the design of the test stand with the drive component or the drive components to be tested, it has proven advantageous, per at least one embodiment, to design stationary supply lines to the test items, for example a lubricant supply and the return thereof, a sensor system or an electric power supply in such a manner that they are simply and reliably separated from the stationary part when the onset of a rotational movement of the housing part in relation to the guide box is detected.

In a further advantageous configuration of at least one embodiment, the drive component to be tested is a transmission, in particular a planetary transmission. Experience has shown that the risk of a blockage for a transmission in comparison to a blockage of the rotor of a generator is higher specifically in a test setup. The use of the proposed rotor bearing unit specifically for transmissions and in particular for planetary transmissions has therefore proven particularly advantageous, per at least one embodiment. By means of the test setup, in the case of transmissions, specifically also consequential damages in the event of a malfunction occurring can be reliably prevented.

In particular, the housing part has a housing flange 14 for fastening the housing of the drive component to be tested thereto for conjoint rotation by means of axially oriented fastening means. The housing of the drive component to be tested can be flange-mounted on the rotor bearing unit via the housing part via a plurality of fastening points distributed in the circumferential direction and in particular distributed on a common radius. A direct fastening to a foundation is avoided. The fastening flange can protrude, for example, over the axial extent of the guide box in the axial direction and can optionally also protrude radially outward from the remaining housing part such that the housing flange 14 can be in particular at least partially provided in a common radius region with the guide box, but spaced axially apart from the guide box. As a result, with little space being required, a correspondingly high torque can be transmitted between the housing of the drive component to be tested and housing part of the rotor bearing unit. The axially oriented fastening means can be screws which are secured with nuts. Alternatively, the housing flange 14 on an axial face side of the housing part can be formed completely radially within the guide box. In order to form the housing flange 14, the housing part can have, for example, axially running passage openings.

Preferably, per at least one embodiment, the housing part has axially oriented blind holes having internal threads for screwing to the housing of the drive component to be tested. The housing of the drive component to be tested can thereby be easily screwed on an axial side of the housing part.

.Particularly preferably, per at least one embodiment, the housing part is configured to be substantially mirror-inverted. As a result, the housing flange 14 and/or axially oriented blind holes 15 having internal threads can also be provided on the other axial side. It is thereby possible to check or test a respective drive component on both axial side of the rotor bearing unit.

In a further embodiment, the guide box has a first part and a second part, wherein the level of frictional locking of the frictionally locking connection can be set by a predeterminable distance between the first part and the second part of the guide box and/or by the tribological contact configuration between the housing part and the guide box. The level of the frictional locking can be realized by the distance and the tribological contact configuration. The distance can be designed to be adjustable by a screw connection, for example. The materials and the surface coating are selected here in such a manner that the adhesion/fretting inclination is low and has good emergency running properties. By means of this adjustment option, the test setup is adaptable to the performance or physical properties of the components, for example nominal power or moment of inertia. Similarly, the circumstances in situ, such as the dimensioning of the foundation or of the carrying or support structure, can be taken into consideration in order to avoid safety-critical states, such as, for example, the breaking of component parts. In particular, the first part and/or the second part have/has an abrasion-resistant sliding surface 16 facing the housing part, wherein the abrasion-resistant sliding surface 16 is formed in particular by a PVD hard material layer and/or by a DLC layer. The upper and/or lower part of the guide box can be formed by one individual, or a plurality of, geometrically defined sliding piece/sliding pieces of known rigidity which have the respective sliding surface. In conjunction with the adjustable distance between the first part and the second part and the coefficient of friction known from the tribological contact configuration, a defined retaining moment can therefore be set. The tribological contact configuration on the first part and/or second part can be designed in such a manner that there is a minimal adhesion inclination, that is to say no fretting, between the materials in contact with one another and in the event of a sliding movement with respect to one another and at the same time there is high abrasion resistance and surface pressure stability. This can be obtained using wear-resistant and high-strength physical vapor deposition (PVD) hard material layers, in particular diamond-like carbon (DLC) layers.

In a further embodiment, the drive component to be tested or the transmission is provided for use in a wind turbine. The arrangement of the test stand and of the test setup is suitable in a particular way for testing one or more drive components, such as, for example, the generator or the transmission, in particular the planetary transmission, of a wind turbine. These drive components are produced in relatively large piece numbers, and the requirements in respect of the reliability are particularly exacting because of the arrangement, to which access is difficult, of the drive components on the tower or in the nacelle of a wind turbine. Furthermore, there are also numerous requirements regarding certification that tests require under defined boundary conditions. Said boundary conditions can be set at the test stand or at the test setup, and therefore said test stand or said test setup is suitable and advantageous to a particular extent for measurements and tests at a planetary transmission for wind power applications.

In a further embodiment, the nominal power of the drive component to be tested is greater than 3 MW. In the case of larger systems from a nominal power of more than 3 MW, the rotation energies during the test operation are at such a high level that a particularly large outlay would have be expended to absorb these malfunctions by the necessary carrying structure and to introduce them into the foundation. The use of the proposed test stand or of the proposed test setup means that the components of the test stand, such as the rotor bearing unit, no longer have to be dimensioned for this malfunction event and can be realized in more lightweight and cost-effective fashion.

In a further embodiment, the test setup is arranged in a back-to-back arrangement. With this arrangement, it is possible to simultaneously test at least two drive components, such as, for example, transmissions, in particular two planetary transmissions. In the case of the back-to-back setup, the test stand or the test setup is formed symmetrically with respect to the centrally arranged rotor bearing unit. In this case, the rotor bearing unit can also be formed symmetrically. The corresponding drive component or the drive components is or are in each case arranged on both sides of the rotor bearing unit. It is advantageous here, per at least one embodiment, for the back-to-back arrangement, also to provide two electric machines, between which the drive components to be tested, such as transmissions or planetary transmissions, and the rotor bearing unit are arranged, in particular symmetrically. By means of the at least two drive components of this arrangement that are to be tested and are connected to one another via the respective shafts, the rotation energy which has to be dissipated by the rotor bearing unit is also increased. With the proposed design of the rotor bearing unit and of the test setup, the safety aspects under consideration can be reliably managed even in the event of these significantly increased rotation energies.

One example of a back-to-back arrangement is transmission torque testing in the system, in which two systems are braced back-to-back and used, for example, as "end of line" series testing.

In a further embodiment, the drive component to be tested is coupled to an electric machine. The electric machine permits a torque to be transmitted to the drive component to be tested and therefore, for example, the transmission to be operated at the desired working point. In this way, test or check points can be approached and processed in a simple way. Furthermore, the shaft of the electric machine is also protected by the design of the rotor bearing unit from blocking and associated destruction. The arrangement of two electric machines, for example in a back-to-back design, is particularly advantageous per at least one embodiment. Torque and rotational speed can then be fed independently of one another to the transmission or to the transmissions.

The electric machine can be mounted here on the foundation of the test stand. In other words, the electric machine stands on the foundation and introduces its weight force there, at least when at a standstill. Alternatively, it is also possible to mount the electric machine on the rotor bearing unit via the housing or, depending on the design, via the housings of further drive components and to introduce the weight force into the foundation via the rotor bearing unit at a standstill.

One aspect of the disclosure relates to the use of a rotor bearing unit which can be designed and developed as described above, and/or of a test setup which can be designed and developed as described above, for testing a planetary transmission for a wind turbine. In particular, a ring gear 17 of the planetary transmission is used as the housing and a sun shaft 18 and/or a planet carrier shaft 19 of the planetary transmission is used as the shaft. The planetary transmission designed for a wind turbine is the above-described drive component which is to be connected to the rotor bearing unit of the test setup.

BRIEF DESCRIPTION OF THE FIGURES

The invention will be described and explained in more detail below with reference to the exemplary embodiments which are illustrated in the figures, in which:

FIG. 1 and FIG. 2 show different views of a rotor bearing unit, and

DETAILED DESCRIPTION

Figure 3:
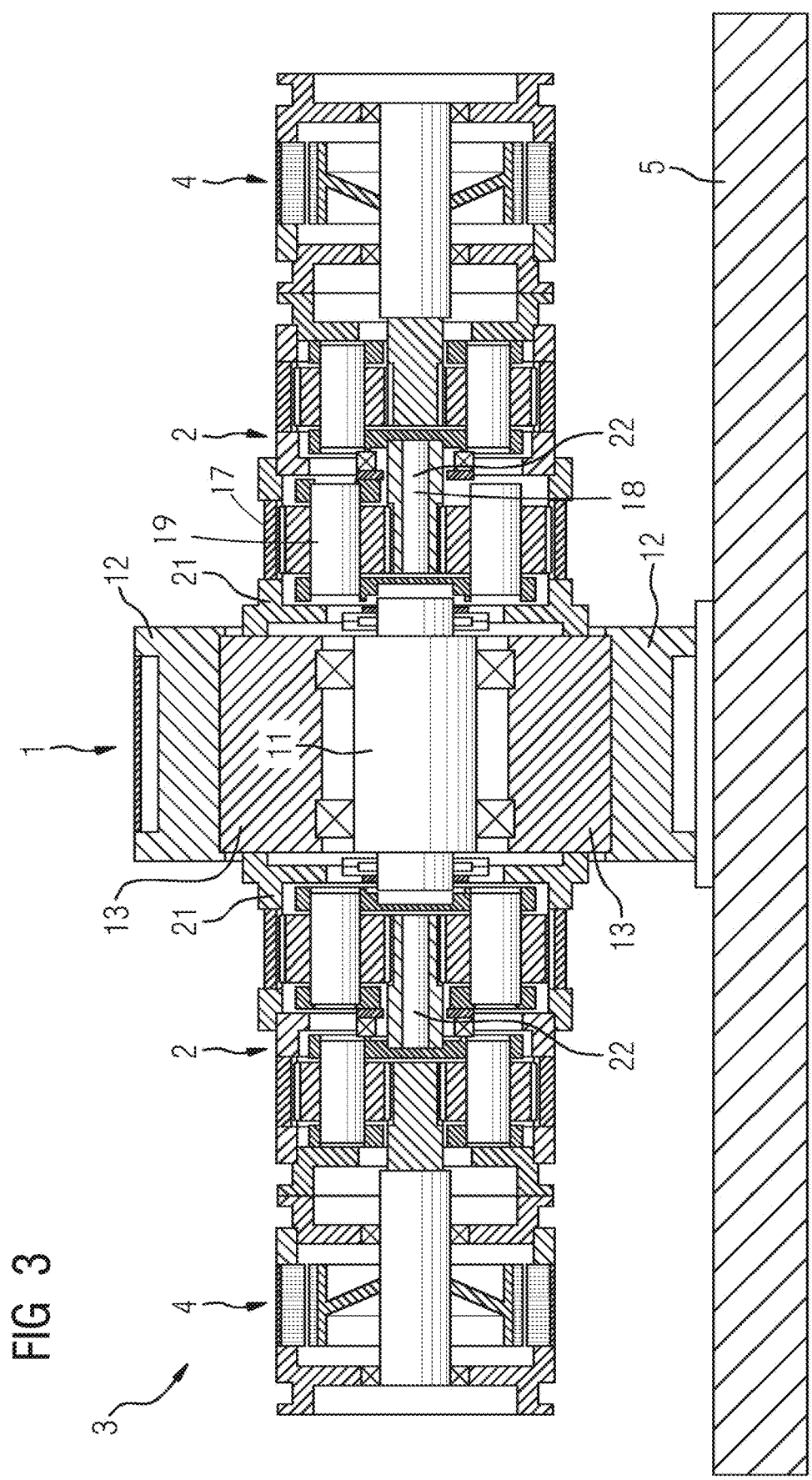
FIG. 3 shows a test setup.

FIG. 1 shows a rotor bearing unit 1. The rotor bearing unit 1 stands on a foundation 5 and has a shaft part 11, a guide box 12, and a housing part 13. The shaft part 11 is arranged rotatably, in particular mounted rotatably, in relation to the housing part 13. The housing part 13 is connected in a frictionally locking manner to the guide box 12, and therefore there is a frictionally locking connection 30 at the boundary between housing part 13 and guide box 12. FIG. 2 shows a further view of the rotor bearing unit 1. To avoid repetitions, reference is made to the description regarding FIG. 1 and to the reference signs introduced there. The guide box 12 can be divided here into a first part 121 of the guide box 12 and into a second part 122 of the guide box 12. By means of an adjustable and predeterminable distance d between the first part 121 and the second part 122, the level of the frictional locking of the frictionally locking connection 30 between the housing part 13 and the guide box 12, which is formed by the first part 121 and second part 122, can be set. A further possibility of changing the level of the frictional locking of the frictionally locking connection 30 resides in the tribological configuration of the frictionally locking connection 30 between the guide box 12 and the housing part 13.

FIG. 3 shows a test setup 3 having a rotor bearing unit 1. To avoid repetitions, reference is made to the description regarding FIGS. 1 and 2 and to the reference signs introduced there. In this exemplary embodiment, the drive component 2 to be tested is a transmission, here a planetary transmission. The drive component 2 to be tested is connected to an electric machine 4 with which the test or check conditions in the form of torque and rotational speed can be fed to the drive component 2 to be tested. The other side of the planetary transmission, i.e. of the drive component 2 to be tested, is connected to the rotor bearing unit 1 such that the shaft 22 of the transmission 2 is mounted rotatably, for example, by means of the rotor bearing unit 1 or by means of a bearing in the transmission. The housing 21 of the drive component 2 to be tested is connected, for example by means of a flange, to the rotor bearing unit 1 and, via this, during dynamic operation can also ensure that torque is fed back into the foundation 5.

Only in the event of a malfunction if, for example, the shaft 22 becomes wedged in the transmission is a force produced between the shaft 22 and the housing 21 of the transmission. The force is also applied to the frictionally locking connection 30, i.e. between the housing part 13 and the guide box 12, because of the force-fitting and/or form-fitting connections between the shaft part 11 of the rotor bearing unit 1 and the shaft 22 of the drive component 2 to be tested and between the housing part 13 of the rotor bearing unit 1 and the housing 21 of the drive component 2 to be tested. If this force exceeds the value which the frictionally locking connection 30 can absorb, the housing part 13 can then move in relation to the guide box 12, i.e. can rotate with the shaft part 11. The force which is transmitted to the foundation 5 via the carrying or support structure is therefore limited. The advantage of the rotation of the housing part 13, per at least one embodiment, then consists in that the force acting because of the malfunction between shaft 22 and housing 21 no longer has to be introduced, at least no longer completely, into the foundation 5 via the rotor bearing unit 1. This reduces the requirements both regarding the strength of the rotor bearing unit 1 and the configuration of the foundation 5.

The design illustrated corresponds to a back-to-back arrangement in which two drive components 2 to be tested, in this exemplary embodiment two planetary transmissions, can be tested. The test setup 3 is constructed symmetrically here, and therefore a second electric machine 4 is also present. The rotor bearing unit 1 which is connected to the transmissions 2 and, for example, supports the planet carriers of the two planetary transmissions 2 is located in the center. The two planetary transmissions 2 are therefore connected to each other via the rotor bearing unit 1. A design of this type is suitable because of its performance in particular for testing or checking a wind transmission, i.e. a transmission for use in a wind turbine, and also for generators of wind turbines and corresponding transmission/generator combinations since they frequently have a nominal power of more than 3 MW. The two electric machines 4 make it possible to independently predetermine torque and rotational speed with which the drive components 2 to be tested are loaded or tested.

In summary, per at least one embodiment, the disclosure relates to a rotor bearing unit for testing a drive component. To improve the arrangement for testing the drive component, it is proposed that the rotor bearing unit has a shaft part, a guide box, and a housing part, wherein the shaft part is arranged rotatably in relation to the housing part, wherein the housing part is connected in a frictionally locking manner to the guide box, wherein the housing part of the rotor bearing unit is designed for force-fitting and/or form-fitting connection to a housing of the drive component to be tested, wherein the shaft part of the rotor bearing unit is designed for force-fitting and/or form-fitting connection to a shaft of the drive component to be tested. The disclosure, per at least one embodiment, further relates to a test setup having a rotor bearing unit of this type, wherein the test setup furthermore has the drive component to be tested, in particular the transmission or the planetary transmission, wherein the housing part of the rotor bearing unit is connected in a force-fitting and/or form-fitting manner to the housing of the drive component to be tested, wherein the shaft part of the rotor bearing unit is connected in a force-fitting and/or form-fitting manner to the shaft of the drive component to be tested.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A rotor bearing unit for testing a drive component, wherein the rotor bearing unit has a shaft part, a guide box, and a housing part, wherein the shaft part is arranged rotatably in relation to the housing part, wherein the housing part is connected in a frictionally locking manner to the guide box, wherein the housing part of the rotor bearing unit is designed for force-fitting connection, form-fitting connection, or both force-fitting connection and form-fitting connection to a housing of the drive component to be tested, wherein the shaft part of the rotor bearing unit is designed for force-fitting connection, form-fitting connection, or both force-fitting connection and form-fitting connection to a shaft of the drive component to be tested, wherein the housing part has a housing flange for fastening the housing of the drive component to be tested thereto for conjoint rotation by means of axially oriented fastening means.

2. The rotor bearing unit as claimed in claim 1, wherein the drive component to be tested is a transmission.

3. The rotor bearing unit as claimed in claim 1, wherein the housing part has axially oriented blind holes having internal threads for screwing to the housing of the drive component to be tested.

4. The rotor bearing unit as claimed in claim 1, wherein the housing part is configured to be substantially mirror-inverted.

5. The rotor bearing unit as claimed in claim 1, wherein the guide box has a first part and a second part, wherein the level of frictional locking of a frictionally locking connection can be set by a predeterminable distance (d) between the first part and the second part of the guide box.

6. The rotor bearing unit as claimed in claim 5, wherein the first part and/or the second part have/has an abrasion-resistant sliding surface facing the housing part, wherein the abrasion-resistant sliding surface is formed by a PVD hard material layer and/or by a DLC layer.

7. A test setup having a rotor bearing unit as claimed in claim 1, wherein the test setup furthermore has the drive component to be tested, wherein the housing part of the rotor bearing unit is connected in a force-fitting manner, a form-fitting manner, or both a force-fitting manner and a form-fitting manner to the housing of the drive component to be tested, wherein the shaft part of the rotor bearing unit is connected in a force-fitting manner, a form-fitting manner, or both a force-fitting manner and a form-fitting manner to the shaft of the drive component to be tested.

8. The test setup as claimed in claim 7, wherein the drive component to be tested is a transmission.

9. The test setup as claimed in claim 7, wherein the drive component to be tested is a wind turbine drive component.

10. The test setup as claimed in claim 7, wherein a nominal power of the drive component to be tested is greater than 3 MW.

11. The test setup as claimed in claim 7, wherein the test setup is arranged in a back-to-back arrangement.

12. The test setup as claimed in claim 7, wherein the drive component to be tested is coupled to an electric machine.

13. A method of testing a wind turbine planetary transmission, the method comprising the steps of:
providing a rotor bearing unit that has a shaft part, a guide box, and a housing part, wherein the shaft part is arranged rotatably in relation to the housing part, wherein the housing part is connected in a frictionally locking manner to the guide box, wherein the housing part of the rotor bearing unit is designed for force-fitting connection, form-fitting connection, or both force-fitting connection and form-fitting connection to a housing of a drive component to be tested, wherein the shaft part of the rotor bearing unit is designed for force-fitting connection, form-fitting connection, or both force-fitting connection and form-fitting connection to a shaft of the drive component to be tested, wherein the housing part has a housing flange for fastening the housing of the drive component to be tested thereto for conjoint rotation by means of axially oriented fastening means.

14. The method as claimed in claim 13, wherein a ring gear of the wind turbine planetary transmission is used as the housing and a sun shaft and/or a planet carrier shaft of the wind turbine planetary transmission is used as the shaft.

15. The rotor bearing unit as claimed in claim 1, wherein the drive component to be tested is a planetary transmission.

16. The test setup as claimed in claim 7, wherein the drive component to be tested is a planetary transmission.

17. The test setup as claimed in claim 8, wherein the transmission to be tested is a wind turbine transmission.

18. The method of claim 13, wherein the test setup furthermore has the drive component to be tested, wherein the housing part of the rotor bearing unit is connected in a force-fitting manner, a form-fitting manner, or both a force-fitting manner and a form-fitting manner to the housing of the drive component to be tested, wherein the shaft part of the rotor bearing unit is connected in a force-fitting manner, a form-fitting manner, or both a force-fitting manner and a form-fitting manner to the shaft of the drive component to be tested.

19. The method of claim 18, wherein a ring gear of the wind turbine planetary transmission is used as the housing and a sun shaft and/or a planet carrier shaft of the wind turbine planetary transmission is used as the shaft.

* * * * *